(12) United States Patent
Simmler et al.

(10) Patent No.: US 6,319,352 B1
(45) Date of Patent: Nov. 20, 2001

(54) SPRAYABLE DISPERSION AND PROCESS FOR ELASTIC ADHESION OF TWO SUBSTRATE SURFACES

(75) Inventors: Emil Simmler; Thomas Simmler, both of Buchberg (CH)

(73) Assignee: Alfa Klebstoffe AG (CH)

( * ) Notice: Subject to any disclaimer, the term of this patent is extended or adjusted under 35 U.S.C. 154(b) by 930 days.

(21) Appl. No.: 08/555,918

(22) Filed: Nov. 13, 1995

(51) Int. Cl.[7] .................................................. C09J 101/00
(52) U.S. Cl. .......................... 156/332; 156/87; 156/333; 156/338; 427/426; 428/317.7; 524/405; 524/501
(58) Field of Search .................................... 156/332, 333, 156/338, 87; 427/426; 428/317.7; 524/501, 405

(56) References Cited

U.S. PATENT DOCUMENTS

| | | | |
|---|---|---|---|
| 2,295,030 | * 9/1942 | Dales | 524/405 |
| 3,165,434 | * 1/1965 | Keskkula et al. | 156/327 |
| 3,770,572 | * 11/1973 | Henry et al. | 524/501 |
| 3,779,857 | * 12/1973 | Hadgraft et al. | 524/405 |
| 4,750,963 | * 6/1988 | Kunishige et al. | 427/426 |

FOREIGN PATENT DOCUMENTS

| | | |
|---|---|---|
| 438906 | 7/1991 | (EP) . |
| 470928 | 2/1992 | (EP) . |
| 2099391 | 3/1972 | (FR) . |

* cited by examiner

*Primary Examiner*—John J. Gallagher
(74) *Attorney, Agent, or Firm*—Bachman & LaPointe, P.C.

(57) ABSTRACT

Boric acid is mixed, preferably at 0.1 to 10 w. % in relation to the solid content, into a sprayable dispersion based on an acrylic acid ester copolymer and a colloidal chloroprene polymerisate.

The spray is applied to at least one or both substrate surfaces, the substrate surfaces to be glued are laid against each other wet and pressed together with at least 0.1 N/cm$^2$ for at least approximately 0.5 seconds.

The sprayable dispersion is preferably used for gluing foams, after a short compression the initial adhesion is so high that further processing or transport can be begun immediately.

11 Claims, 1 Drawing Sheet

SPRAYABLE DISPERSION AND PROCESS FOR ELASTIC ADHESION OF TWO SUBSTRATE SURFACES

BACKGROUND OF THE INVENTION

The invention relates to a sprayable dispersion based on an acrylic acid ester copolymer and a colloidal chloroprene polymerisate. The invention also concerns a process for the elastic adhesion of two substrate surfaces, of which at least one is porous in structure, using this dispersion. Here and below the term acrylic acid ester copolymer also comprises an acrylic acid ester styrene copolymer.

Acrylic acid ester copolymers are for example the substances ACRONAL 310S, S600 or DS3382 by the company BASF, chloroprene polymerisates are the substances DISPERCOLL C74 or C84 by the company BAYER.

When two substrate surfaces are coated with an adhesive and pressed together after the adhesive has dried, the adhesive is called a contact adhesive. This can only develop its effect when the solvent or water has evaporated. If only one of the two substrate surfaces to be joined is coated with an adhesive and the other substrate surface pressed on after evaporation of the solvent or water, we have a bonding adhesive. Of particular importance are contact adhesives based on polychloroprene, resins and organic solvents. The solid content is usually only 10–25 w. %, the organic solvents predominate by far.

Contact adhesives dissolved in highly volatile organic solvents can be processed quickly. This advantage is however largely or even predominantly eliminated by a number of disadvantages. The organic solvents which escape on spraying and drying represent a significant loss in economic terms. The volatile solvents are also inflammable, harmful to health and/or the environment. Therefore special systems must always be constructed and precautions taken to prevent or at least reduce the uncontrolled escape of solvents. EP, A1 0470928 describes a process for elastic adhesion of two substrate surfaces. At least one of these is porous in structure. A rubber-containing first dispersion with an acrylic acid ester copolymer and a colloidal second dispersion of a chloroprene polymerisate are applied to at least one of the substrate surfaces after prior or with simultaneous mixing. The substrate surfaces to be glued are then, immediately afterwards or later, laid against each other with the adhesive dispersions wet, and pressed together. The two substrate surfaces adhere with a high initial force even at room temperature and achieve a high final force. No organic solvents are required, but only low quantities of waste water occur which can easily be cleaned and disposed of. The spectrum of applications is broad but lies in particular in the adhesion of foams.

SUMMARY OF THE INVENTION

The inventors have faced the task of creating a sprayable dispersion and a process for elastic adhesion of two substrate surfaces with a dispersion of the type described initially, which further improves the initial adhesion force of the substrate surfaces laid against each other wet, also guarantees a high final adhesion force and in particular a long processing time after application of the dispersion, without loss of the ecological and economic advantages.

In relation to the sprayable dispersion, the task according to the invention is solved in that it contains boric acid which is mixed into the dispersion.

The sprayable dispersions can be used as contact or bonding adhesives. A high initial adhesion force absolutely comparable to those of solvent-containing adhesives can be achieved in seconds after application if the two substrate surfaces are laid against each other wet and pressed together. A similarly high initial adhesion force, which is even higher for a longer time, is achieved if the applied dispersions are first ventilated and then the substrate surfaces laid against each other wet. No production stoppages occur as the machine stoppage is shorter, and the applied dispersion remains wet for a long time.

The adhesion dispersions are pressure-sensitive. Immediately after pressing together, the actual bonding process begins without water being emitted. This is of great practical significance as wet surfaces coated with dispersion can be pressed together and immediately achieve the initial adhesion force necessary for further processing and/or transport. This force rapidly increases after processing and achieves for example the limit of tear for a foam of medium hardness.

The dispersions are produced in a mixer of conventional type where the chloroprene polymerisate is preferably added at the end. A mixed dispersion can be stored under airtight conditions for several months without coagulating.

Acrylic acid ester copolymers, including acrylic acid ester styrene copolymers as stated, can for example be made to contain rubber by the addition of natural unvulcanized latex. The chloroprene polymerisate can contain smaller quantities of monomers other than chloroprene, for example other dienes, acrylic acid or methacrylic acid. In total however the quantity of the other monomers added preferably does not exceed 30 w. % in relation to the chloroprene polymerisate. The mean particle size of the acrylic acid ester copolymer and the chloroprene polymerisate is preferably in the sub-micron range, in particular approximately 0.2 $\mu$m.

Watery dispersions of the, acrylic acid ester copolymer and the chloroprene polymerisate have for example a solid content of 30–70 w. %, in particular 40 to 65 w. %.

The isolated ratio of the acrylic acid ester copolymer to the colloidal chloroprene polymerisate can vary within a relatively broad band, preferably from 10 w. % acrylic acid ester copolymer: 90 w. % chloroprene polymerisate up to 60 w. % acrylic acid ester copolymer: 40 w. % chloroprene polymerisate. In other words, the weight ratio of acrylic acid ester copolymer to chloroprene polymerisate preferably lies in the range between 1:10 and 1.5:1. In practice the mixing ratio is usually around 50:50 w. % and, by deviation, as a trend more chloroprene polymerisate is added. The data on the mixing ratios always relates to the solid content.

For a general setting of the pH values and addition of secondary substances, see EP, A1 0470928 page 4 lines 22 to 33.

The addition of boric acid ($H_3BO_3$) to the dispersion, essential to the invention, preferably takes place in a quantity of 0.1 to 10 w. %, in particular 0.5 to 5 w. % in relation to the solid content. The addition of boric acid drastically improves the initial adhesion force of the sprayable dispersion even after a longer ventilation time.

With a high boric acid concentration, the boric acid is preferably first dissolved in glycerine.

Apart from the boric acid, sodium lauryl sulphate can be added, preferably in a concentration of 0.1 to 3 w. % in relation to the finished mixture. This improves the mechanical properties, in particular the processability, of the preferred sprays.

Organic components can also be added which specifically promote required properties of the dispersion: N-alkylpyrrolidone, for example in the form of N-methyl- 2-pyrrolidone up to 15 w. % in relation to the solid content and/or N-octyl-2-pyrrolidone or N-dodecyl-2-pyrrolidone, in each case up to 10 w. % again in relation to the solid content.

N-methyl-2-pyrrolidone can also be mixed with N-octyl-2-pyrrolidone or N-dodecyl-2-pyrrolidone, with unchanged weight ratios. N-methyl-2-pyrrolidone is a softening agent, the two other pyrrolidones promote the coagulation ability and wetting.

With the aim of softening, improving adhesion, heat resistance and storage stability, in addition to boric acid, dimethylphthalate or diisobutylphthalate can be added as other components, preferably at up to 20 w. % again in relation to the solid content.

As indicated above, fine grain filler materials can be mixed in, preferably ZnO, MgO and/or colour pigments.

In relation to the process, the task is solved by the invention in that the dispersion is applied to at least one of the substrate surfaces, the substrate surfaces to be glued are applied to each other wet and pressed together with at least 0.1 N/cm$^2$ for approximately 0.5 seconds.

When the dispersion leaves a spray device, a spray nozzle, spray beam or similar atomiser, the pressure-sensitive dispersion begins to coagulate immediately. In addition to improving the initial adhesion force, this has the advantage that practically no dust-like particles escape into the surrounding air which contaminate work place hygiene and the environment. Coagulation is so quick that under extreme conditions thick layers, even projecting bulges, can be applied to vertical surfaces without the layer running.

If the dispersion according to the invention is rolled, painted or poured on instead of being sprayed or spray-coated, the initial force of the adhesion may be reduced. Although this is an improvement over the previously known state of the art, as a rule only spraying or spray-coating in the full extent is sufficient according to the invention.

The spray product is preferably applied with an air pressure of 0.5 to 1.5 bar and a material pressure of 0.1 to 1.0 bar, in particular 0.1 to 0.5 bar.

The spray product is preferably applied at a specific quantity of 30 to 300 g/m$^2$, in particular 50 to 150 g/m$^2$. It is preferably sprayed at room temperature, such that the initial adhesion force acts quickly and strongly which normally renders heating superfluous in practice.

The wet substrate surfaces to be glued can be pressed together immediately after coating or up to 60 minutes, preferably up to 30 minutes, later, without the initial adhesion force being essentially changed.

The surfaces are pressed together suitably for 1 to 5 seconds, preferably with 0.1 to 1 N/cm$^2$, in particular with approximately 0.5 N/cm$^2$. They may be pressed together several times with complete or partial removal of load. Repeating but also increasing the contact pressure will increase the initial adhesion which is not always desirable. Immediate processability and maintaining the initial adhesion force after a longer ventilation time are essential.

One particularly advantageous application of the sprayable dispersion according to the invention is the gluing of foams. A common work process here is to glue square foam blocks into cushions, in particular where the narrow side surfaces are bent and after application of an adhesive according to the invention can be pressed together immediately while wet. Thanks to the high initial adhesion force, the contact pressure applied can be removed again immediately. The foam under stress does not shift or spring back, even with ventilation times of up to half an hour.

Foams of all types, in particular made of polyethylene, polyether, polyurethane or natural latex have a broad spectrum of applications in the upholstery industry, for sports articles etc. One particularly valuable application lies in covering moulded foams with a textile coating, for example a fabric-covered vehicle seat.

The most important advantages of the present invention can be summarised as follows:

extraordinarily high and rapid initial adhesion force of wet dispersions, even at room temperature and after long ventilation, no organic solvents or solvent components which harm the work place and environment, low mist spray application, low quantities of waste water which can easily be cleaned and disposed of, hence no problems with stringent workplace hygiene and fire regulations or waste water regulations, broad spectrum of applications.

BRIEF DESCRIPTION OF THE DRAWINGS

The invention is explained in more detail using the design examples shown in the drawing which are also the subject of dependent patent claims. Here:

DETAILED DESCRIPTION OF THE DRAWINGS

For the experiments, in each case a square foam of medium hardness was used with an adhesive surface of 3×3 cm. In all variants, the dispersions were applied at room temperature where the acrylic acid ester copolymers and colloidal chloroprene polymerisates were mixed in a weight ratio of 1:1 in relation to solid content and applied to two substrate surfaces. All adhesive types also contained 1 to 2 w. % boric acid.

Figure 1:
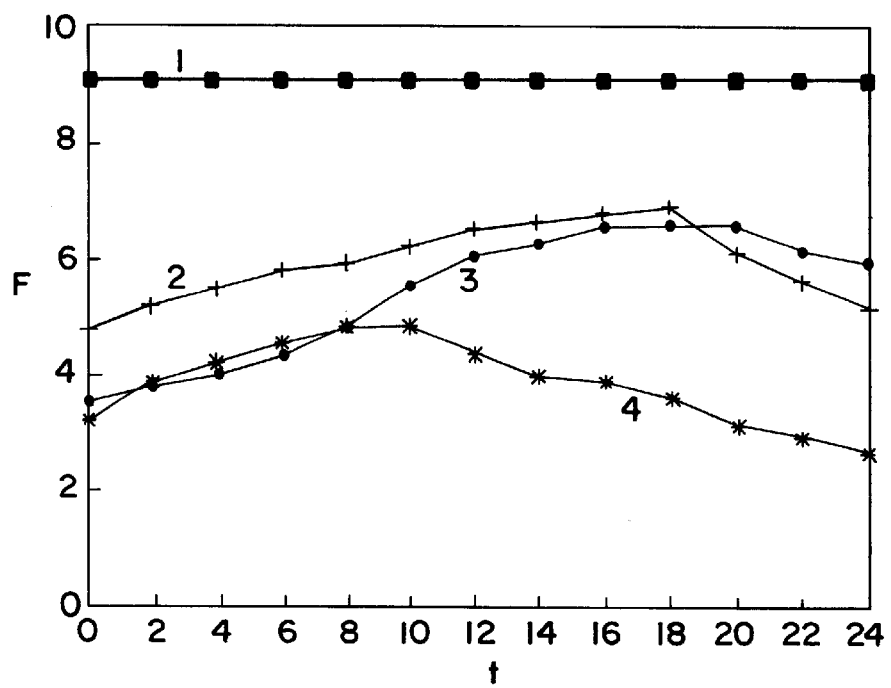
FIG. 1 shows the initial adhesion F of various adhesive types as a function of ventilation time.

In FIG. 1, F indicates the initial adhesion in N/cm$^2$ as a function of the ventilation time t in minutes, the room temperature was approximately 15° C., the two adhesive surfaces were pressed together for 5 seconds with a contact pressure of 0.5 N/cm$^2$. The dispersion adhesive was applied at 140 g/m$^2$.

Curve 1 running parallel to the time abscissa shows a foam tear limit of approximately 9 N/cm$^2$.

Curve 2 shows the development of the initial adhesion of the dispersion adhesive 3086 according to the invention by the applicant. The initial adhesion measured immediately after contact was approximately 5 N/cm$^2$. If the substrate surfaces coated with the dispersion adhesive are placed together after a ventilation time of up to 18 minutes and pressed together, the initial adhesion rises to approx 7 N/cm$^2$ but with longer ventilation times falls relatively steeply as the open time is exceeded.

Curve 3 shows the dispersion adhesive SIMALFA 308 according to the invention by the applicant which in comparison with curve 2 has a relatively low initial adhesion of approximately 3.5 N/cm$^2$. With longer ventilation times, the initial adhesion however increases greatly and after prior ventilation of 20 minutes reaches approximately 6.5 N/cm$^2$. If the wet substrate surfaces are pressed together later, the initial adhesion falls slightly.

Curve 4 with the dispersion adhesive 3087 according to the invention by the applicant has an even lower initial adhesion in comparison with curve 3. Should this is not be sufficient for practical requirements, which can scarcely be the case in practice, the coated surfaces can first be ventilated for several minutes after which the initial adhesion rises greatly but falls again slightly after 10 minutes.

For the sake of clarity, it is emphasised that curves 2 to 4 in FIG. 1 always show the initial adhesion measured for 5 seconds immediately after pressing together. The time development of the bonding is not shown in these curves.

If a foam of low hardness, eg. a polyurethane foam of density 30–40 kg/m$^3$, is used with a foam tear limit of approximately 6.5 N/cm$^2$, the highest value for the initial adhesion of curves 2 and 3 would itself be sufficient to tear the foam.

Figure 2:
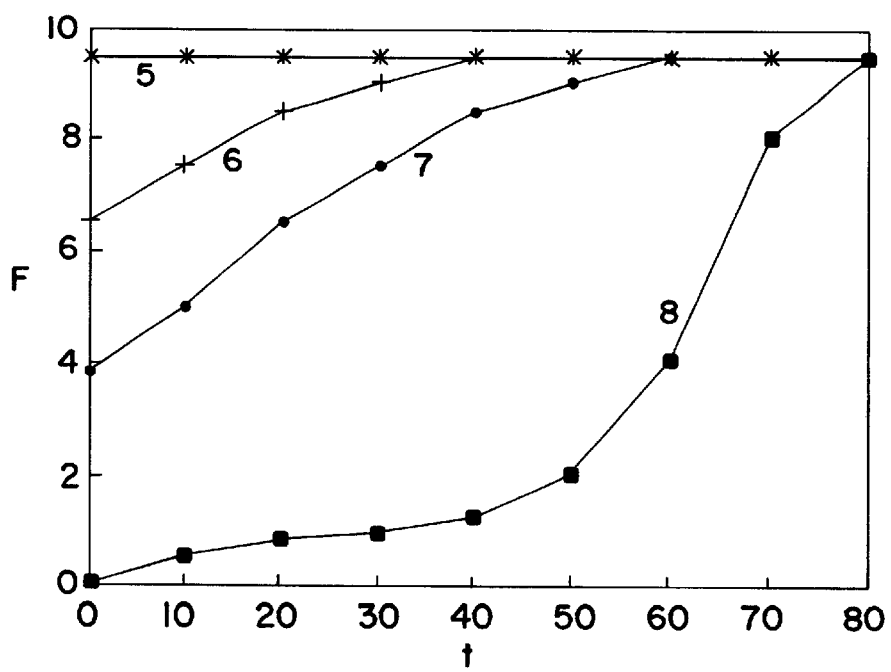
FIG. 2 shows the development of the bonding of various adhesive types.

FIG. 2 shows the development of the bonding of the dispersion adhesive SIMALFA 308, according to the invention is shown. The room temperature was 17° C., the contact pressure and times corresponded to FIG. 1. The dispersion adhesive was applied at only 120 g/m$^2$. The average hardness of the foam used was slightly higher than in FIG. 1, approximately 9.5 N/cm$^2$ (curve 5). According to curve 6, substrate surfaces ventilated for approximately 20 minutes were laid together and pressed together for 5 seconds with a contact pressure of 0.5 N/cm$^2$. Immediately the initial adhesion was 6.5 N/cm$^2$. The adhesive strength of a sample was tested every 10 minutes. This increases and after approximately 40 minutes reaches the foam tear limit.

Curve 7 was determined after proceeding in the same way. The wet substrate surfaces were however pressed together just 1 minute after application. The adhesive strength increases from the initial adhesion of slightly under 4 N/cm$^2$ to the foam tear limit after approximately 60 minutes.

With a foam of lower hardness, for example the polyurethane foam described above, the adhesive strength according to curve 6 was achieved immediately after pressing together, and that according to curve 7 approximately 20 minutes later. This value is not however of particular importance, far more important is the initial adhesion which is sufficient for immediate further processing.

Curve 8 finally shows the curve development of a general conventional dispersion adhesive which has an initial adhesion of practically zero which rises slowly. Even the lowest values according to the invention for initial adhesion are achieved by such dispersion adhesives only after approximately one hour. This means there is no possibility of immediate further processing or transport after compression as the dispersion adhesive does not reach the level necessary for processing until after approximately 50 minutes.

What is claimed is:

1. Sprayable dispersion comprising an acrylic acid ester copolymer and a colloidal chloroprene polymerisate, said dispersion further characterised in that it contains an amount of boric acid sufficient to improve the initial adhesion force properties of the dispersion.

2. Dispersion according to claim 1, characterised in that with a weight ratio of acrylic acid ester copolymer to chloroprene polymerisate of preferably 1:10 to 1.5:1, in particular approximately 1:1, in relation to the solid content, it has a boric acid proportion of 0.1 to 10 w. %.

3. Dispersion according to claim 2, characterised in that it has a boric acid proportion of 0.5 to 5 w. %, preferably 1 to 2 w. %.

4. Dispersion according to claim 1, characterised in that it contains sodium lauryl sulphate, preferably 0.1 to 3 w. % to improve the mechanical Properties of the sprayable dispersion.

5. Dispersion according to claim 1, characterised in that it contains an N-alkylpyrrolidone, preferably up to 15 w. % N-methyl-2-pyrrolidone, and/or a substance of the group consisting of N-octyl-2-pyrrolidone and N-dodecyl-2-pyrrolidone, preferably in each case up to 10 w. % in relation to the solid content.

6. Dispersion according to claim 1, characterised in that it contains dimethylphthalate or diisobutylphthalate, preferably in each case up to 20 w. % in relation to the solids content to soften and to improve adhesion properties, heat resistance and storage stability of said dispersion.

7. Process for elastic adhesion of two substrate surfaces, at least one of which is porous in structure, comprising the steps of: applying a dispersion comprising an acrylic acid ester copolymer and a colloidal chloroprene polymerisate and further comprising boric acid in an amount sufficient to improve the initial adhesion force properties of the dispersion to at least one of the substrate surfaces, and gluing the substrate surfaces together by laying said surfaces together wet and pressing said surfaces together with at least 0.1 N/cm$^2$ for at least approximately 0.5 seconds.

8. Process according to claim 7, characterised in that the dispersion is sprayed on or spray-coated, preferably with an air pressure of 0.5 to 1.5 bar and a material pressure of 0.1 to 1.0 bar.

9. Process according to claim 7, characterised in that the applied dispersion is ventilated before laying and pressing together for 0 to 60 minutes, preferably for 0 to 30 minutes.

10. Process according to any of claims 7, characterised in that the wet substrate surfaces to be glued are pressed together at least once for 1 to 5 seconds, preferably with 0.2 to 1 N/cm$^2$.

11. A sprayable dispersion for bonding two substrate surfaces together, said dispersion comprising an acrylic acid ester copolymer and a colloidal chloroprene polymerisate, said acrylic acid ester copolymer and said chloroprene polymerisate being present in a weight ratio of the acrylic acid ester copolymer to the chloroprene polymerisate of 1:10 to 1.5:1 and said dispersion further comprising from about 0.1 to 10% by weight of boric acid to improve the initial adhesion force properties of the dispersion.

* * * * *

(12) EX PARTE REEXAMINATION CERTIFICATE (5621st)
United States Patent
Simmler et al.

(10) Number: US 6,319,352 C1
(45) Certificate Issued: Nov. 28, 2006

(54) SPRAYABLE DISPERSION AND PROCESS FOR ELASTIC ADHESION OF TWO SUBSTRATE SURFACES

(75) Inventors: Emil Simmler, Buchberg (CH); Thomas Simmler, Buchberg (CH)

(73) Assignee: Alfa Klebstoffe AG, Buchberg (CH)

Reexamination Request:
No. 90/006,580, Mar. 28, 2003

Reexamination Certificate for:
Patent No.: 6,319,352
Issued: Nov. 20, 2001
Appl. No.: 08/555,918
Filed: Nov. 13, 1995

(51) Int. Cl.
*C09J 101/00* (2006.01)

(52) U.S. Cl. .................. 156/332; 156/87; 156/333; 156/338; 427/426; 428/317.7; 524/405; 524/501

(58) Field of Classification Search ................ 156/332, 156/333, 338, 87; 427/426; 428/317.7; 524/405, 524/501
See application file for complete search history.

(56) References Cited

U.S. PATENT DOCUMENTS

| | | | | |
|---|---|---|---|---|
| 3,165,434 A | * | 1/1965 | Keskula et al. | |
| 3,779,857 A | * | 12/1973 | Hadgraft et al. | |
| 4,608,111 A | | 8/1986 | Hume, III et al. | |
| 4,879,333 A | * | 11/1989 | Frazee | |
| 5,066,522 A | * | 11/1991 | Cole et al. | |
| 5,610,239 A | | 3/1997 | Skelley | |
| 6,086,997 A | * | 7/2000 | Patel et al. | |

FOREIGN PATENT DOCUMENTS

| EP | 470928 A1 | * | 2/1992 |
|---|---|---|---|
| GB | 1392614 | * | 4/1975 |

* cited by examiner

*Primary Examiner*—Geoffrey L. Knable

(57) ABSTRACT

Boric acid is mixed, preferably at 0.1 to 10 w. % in relation to the solid content, into a sprayable dispersion based on an acrylic acid ester copolymer and a colloidal chloroprene polymerisate.

The spray is applied to at least one or both substrate surfaces, the substrate surfaces to be glued are laid against each other wet and pressed together with at least 0.1 N/cm$^2$ for at least approximately 0.5 seconds.

The sprayable dispersion is preferably used for gluing foams, after a short compression the initial adhesion is so high that further processing or transport can be begun immediately.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *